(No Model.)
J. KLINE.
PIPE JOINT.
No. 278,800. Patented June 5, 1883.
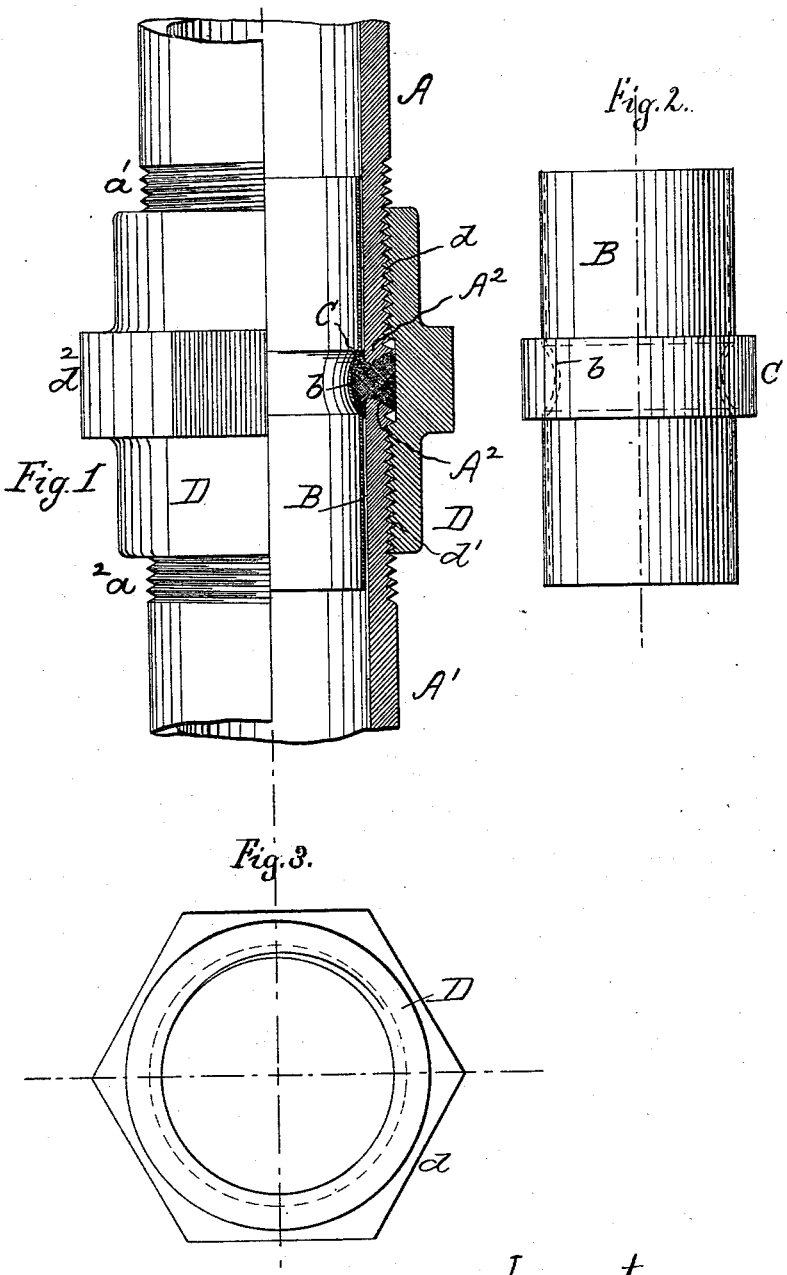

UNITED STATES PATENT OFFICE.

JOSEPH KLINE, OF PHILADELPHIA, PENNSYLVANIA.

PIPE-JOINT.

SPECIFICATION forming part of Letters Patent No. 278,800, dated June 5, 1883.

Application filed November 16, 1882. (No model.)

*To all whom it may concern:*

Be it known that I, JOSEPH KLINE, a citizen of the United States, residing at Philadelphia, in the county of Philadelphia and State of Pennsylvania, have invented certain new and useful Improvements in Pipe-Joints, of which the following is a specification, reference being had therein to the accompanying drawings, wherein—

Figure 1 is a sectional elevation of a pipe joint or coupling embodying my invention. Fig. 2 is a detail elevation of internal sleeve and flexible packing-ring, and Fig. 3 is a plan of the coupling-sleeve.

My invention has relation to pipe joints or couplings, and has for its object to provide a simple, inexpensive, and durable coupling or joint, the parts of which are readily arranged in relation with one another and adjusted together to form a perfectly-tight joint.

My invention accordingly consists of the novel combination, construction, and arrangement of parts comprising a pipe joint or coupling, as hereinafter more specifically described and claimed.

Referring to the accompanying drawings, A and A' represent two adjacent pipe ends, each of which is threaded at $a'$ and $a^2$, respectively, but in opposite directions. The edges $A^2$ of said ends are illustrated as being beveled; but, if desired, they may be square.

B represents a sleeve designed to be placed within the pipes, so as to extend a short distance on each side of their junction, and is formed with an annular recess or groove, $b$, for the reception of a packing-ring, C. When the sleeve B is arranged within the pipes, the ring or packing C interposes between the edges $A^2$ of the pipe-sections, as shown in Fig. 1.

D represents the exterior coupling-sleeve, internally threaded with right and left threads $d$ $d'$, which respectively engage with correspondingly-formed threads on the pipe-sections. Said coupling-sleeve is provided with a nut, $d^2$, for a wrench; or a series of holes for the reception of a turning rod or bar may be substituted for said nut; or said sleeve may be smooth or cylindrical in outline and turned by means of a pipe-wrench. As the sleeve D is turned the pipe-sections are drawn together, the packing C is compressed, and a perfectly-tight joint or coupling is formed for said sections.

The packing-ring C may be of rubber or other elastic substance, or waste asbestus or plastic materials may be employed therefor.

The sleeve B serves to protect the packing from the material conducted through the pipes, and it may be formed with the groove $b$, as described, or it may be perfectly plain and the ring C caused to adhere thereto by friction. If desired, however, the sleeve B may be dispensed with altogether.

I have shown and described the sleeve B and packing-ring C in connection with the pipe ends A and A', having reverse threads and coupling-sleeve D; but I do not limit myself thereto, as said sleeve and ring may be used with other forms of pipe-couplings.

What I claim is—

1. The sleeve B, having annular recess or groove $b$ and packing-ring C, substantially as and for the purpose set forth.

2. The combination of pipe-sections A and A', sleeve B, having annular groove $b$, packing-ring C, and coupling-sleeve D, substantially as shown and described.

In testimony whereof I affix my signature in presence of two witnesses.

JOSEPH KLINE.

Witnesses:
S. J. VAN STAVOREN,
CHAS. F. VAN HORN.